United States Patent [19]
Fuchs et al.

[11] Patent Number: 5,862,604
[45] Date of Patent: Jan. 26, 1999

[54] PROCESS FOR COORDINATE MEASUREMENT ON WORKPIECES

[75] Inventors: Anton Fuchs; Gunter Grupp, both of Boehmenkirch, Germany

[73] Assignee: Carl-Zeiss-Stiftung, Heidenheim, Germany

[21] Appl. No.: 680,924

[22] Filed: Jul. 14, 1996

[30]  Foreign Application Priority Data

Jul. 13, 1995 [DE] Germany ................ 195 25 592.5

[51] Int. Cl.[6] .................................................. G01B 5/12
[52] U.S. Cl. .................. 33/503; 33/559; 364/474.37; 702/168
[58] Field of Search ............... 33/503, 504, 558, 33/561, 505, 556, 559; 364/474.37, 474.03, 551.01, 571.01, 571.02, 571.03, 571.04, 571.05, 571.06, 571.07, 571.08

[56]  References Cited

U.S. PATENT DOCUMENTS

| | | | |
|---|---|---|---|
| 4,177,568 | 12/1979 | Werner et al. | |
| 4,391,044 | 7/1983 | Wheeler | 33/561 |
| 4,455,755 | 6/1984 | Fritsche et al. | 33/504 |
| 5,425,180 | 6/1995 | Breyer | 33/503 |
| 5,579,246 | 11/1996 | Ebersbach et al. | 33/504 |
| 5,726,917 | 3/1998 | Staaden | 33/504 |

FOREIGN PATENT DOCUMENTS

| | | |
|---|---|---|
| 3831974 | 3/1990 | Germany . |
| 4204602 | 2/1992 | Germany . |
| 4316236 | 7/1994 | Germany . |

*Primary Examiner*—Diego F. F. Gutierrez
*Assistant Examiner*—Andrew Hirshfeld

[57]  ABSTRACT

A sensor in the probe head of a coordinate measuring device supplies probe signals. The first, and if necessary, higher time derivatives of the probe signals are formed and evaluated for the exact determination of the moment of contact of the probe head with a workpiece to be measured. During the evaluation, the time course of the differentiated signals is examined by means of automatically generated trigger thresholds.

12 Claims, 5 Drawing Sheets

PROCESS FOR COORDINATE MEASUREMENT ON WORKPIECES

BACKGROUND OF THE INVENTION

1. Field of the Invention

The invention relates to a process for coordinate measurement on workpieces with a probe head that produces a signal on contact with the workpiece which is to be measured, and also a coordinate measuring device that is suitable for carrying out the process.

2. Discussion of Relevant Prior Art

A distinction is made in coordinate measurement technology between two different types of probe heads. Probe heads of the so-called switching type provide, on contact with the workpiece, either a switching signal, which is derived, e.g., from electrical switches in the bearings of the movable probe pin, or a pulse-form signal, which is produced, for example, by highly sensitive piezoelectric elements in or near the probe pin.

Switching probe heads are also known which produce two different signals in the course of a contact process: a piezo signal and in addition, a switching signal from the bearings of the deflected probe pin. The two signals are then mutually somewhat displaced in time, since the switch contact opens later than when the more sensitive piezo crystal is excited. Such probe heads are described, for example, in German Laid-Open Patent DE-OS 3,831,974 and in U.S. Pat. No. 4,177,568.

Probe heads of the measuring type permanently provide a signal proportional to the deflection of the flexible probe pin in the three coordinate directions. Such probe heads can be used not only for continuous scanning of workpieces, but also for single point measurements in which, by setting suitable trigger thresholds, a switching signal is produced from the signal that is proportional to the deflection.

In order to determine the coordinates of a contact point on a workpiece with a probe head of the switching type, the procedure has heretofore been as follows:

The counter states of the measuring systems (scale systems) of the coordinate measurement device are stored in an intermediate memory when, e.g., the intensity of the signal emitted from the piezo crystal exceeds a predetermined trigger threshold. If the second signal arrives at the machine control from the bearings within a predetermined time of, e.g., 200 ms, the contact is found to be valid, and the intermediately stored position measurement value is then transferred to the computer of the coordinate measurement value. In other cases, the control of the coordinate measuring device caused a repetition of the measurement. In this case, the control was derived from the fact that, as regards the piezo signal, the signal concerned was not one which indicates the contact with the workpiece, but for example a spurious signal originating from vibration or noise from the surroundings, the mounting, or the running of the machine. This lead to a so-called "contact optimizing" in which the machine again travels over the position in question.

A process which is very similar to that described hereinabove is also described in European Patent EP B1 0 025 485.

The known process in fact works satisfactorily in many situations. However, in a number of applications, the known process leads to invalid contacts. For example, when soft parts of aluminum or plastic are measured, or any workpieces are measured with low contact speeds, the signal of the piezoelement is absent or goes below the fault signal level. In such cases, even a repetition of the measurement gives no other results, and either the contact speed must be increased, or the electromechanical switching signal from the bearings must take over the function of the contact signal without the signal of the piezoelement. This results in deterioration of measurement accuracy, because the switching signal from the bearings occurs at a later time than the signal of the piezoelement, and thus no longer characterizes the exact contact coordinates of the contact point.

Long, thin probe pins also give rise to problems in determining the exact moment of contact. In working with these pins, only small amplitudes result from the probe signal, and the course of the probe signal is greatly scatterred.

German Patent DE 4,204,602 describes a process where the moment of contact can be more exactly determined in spite of the problems mentioned above. Here the probe signal is correlated with model signals that have been previously stored, and the exact moment of contact is determined by means of the signal course of the model signal. However, the courses of probe signals depend on a relatively large number of parameters. Many different model signals must be recorded and stored. These model signals must be preselected corresponding to the parameters that are present during the particular measurement, if the process is to provide satisfactory results.

In German Patent DE-PS 4,316,236, it is proposed to determine the exact moment of contact by approximating the rising flank of the probe signal with a suitable curve, and extrapolating this to the value U=0. It has been found that the time course of the probe signal, and in particular of the rising flank, is greatly scattered. Depending upon the portion of the flank that is chosen for the curve fitting, completely different values result for the moment of contact extrapolated therefrom, so that this process does not operate satisfactorily.

SUMMARY OF THE INVENTION

The object of the present invention is to provide a process for coordinate measurement on workpieces by means of which the disadvantages set forth above are overcome and the moment of contact can be determined as reliably as possible. Another object of the invention is to provide a coordinate measuring device that is suitable for carrying out this process.

A process according to the invention for coordinate measurement on workpieces employs a coordinate measuring device with a probe head that produces a signal on making contact with a workpiece to be measured, and includes differentiating the probe signal with respect to time and evaluating a first and/or higher time derivatives of the probe signal to determine the exact moment of contact of the probe head with the work piece.

A second embodiment of the process according to the invention involves calculating a related frequency spectrum multiple times by Fourier transformation from a stored time course of the probe signal, and evaluating the related frequency spectrum in relation to frequency components in given frequency regions.

A coordinate measuring device according to the invention has a probe head that produces a probe signal on contact with the workpiece to be measured and includes a first memory unit to which the probe signal is fed, and in which a time course of the probe signal is stored, and a second memory unit, in which length measurement values (x, y, z) for a position of the probe head is stored at least for a time interval that includes the moment of contact of the probe head with the workpiece. The coordinate measuring device also includes an evaluation unit to which the memory units are connected, which determines the exact moment of contact or an exact contact position corresponding to the moment of contact. The evaluation unit includes means for differentiating the probe signal and means for establishing whether the amplitude of a singly or multiply differentiated probe signal has reached an adjustable threshold.

A second embodiment of a coordinate measuring device according to the invention has an evaluation unit that includes means for Fourier transformation of the course of the probe signal and means for establishing whether the Fourier spectrum has frequency components in given frequency regions.

According to the first embodiment of the process according to the invention, the probe signal is differentiated at least once, or possibly repeatedly, with respect to time, and the first and/or higher derivatives of the course of the probe signal are evaluated for determining the exact moment of contact. It has been found that the variations of the probe signal with time, in particular the third derivative, which describes the so-called "jolt" (the change of the acceleration with time) react much more sensitively to a contact process than does the probe signal itself. In contrast to this, the disturbances superimposed on the probe signal, for example, the effects of acoustic noise in the surroundings, have no such effect on the higher derivatives of the probe signal.

It is thus possible to find the exact moment of contact, in that trigger thresholds are applied to one or more of the time derivatives of the probe signal, and reaching or exceeding them gives the moment of contact.

These trigger thresholds are advantageously adjustable and can also be automatically matched to the noise amplitude on the probe signal lead.

The time differentiation of the probe signal can take place in an analog manner or by means of digital computers, in which the stored probe signal is successively differentiated, and the moment of contact and the contact coordinates related to the moment of contact are calculated back in time.

The process makes it possible to find the exact moment of contact from the course of the probe signal by a robust and inexpensive algorithm. The exact moment of contact can be measured, even when the signal depends on many different and partially fortuitous factors, such as the material of the workpiece to be measured, the geometry and material of the probe unit assembly, the direction and speed of contact, the angle to the workpiece surface, or the travel behavior of the machine, etc.

According to the second embodiment of the process according to the invention, the associated frequency spectrum is calculated repeatedly by Fourier transformation from the stored time course of the probe signal and is evaluated as regards frequency components in given frequency ranges. This evaluation can take place, for example, in that several probe signal courses, which are successive or are mutually displaced in time, are Fourier transformed, and the moment of the first appearance of frequency components in the given frequency ranges is then assigned as the moment of contact.

This second process requires a considerably higher computing effort than the first process according to the invention. Since the price of computing power continually falls with increasing computer capabilities, the second process is also a thoroughly practical alternative for the more reliable recognition of the moment of contact. In other respects, both processes are based on a common technical principle. In both cases, the appearance of large changes with time of the course of the probe signal is used to recognize the moment of contact. These changes with time are the cause of the appearance of additional frequency components in given frequency regions.

BRIEF DESCRIPTION OF THE DRAWINGS

The present invention will now be described, taken together the accompanying drawings, in which:

FIG. 2a shows the original probe signal;

FIG. 2b shows the first derivative of the probe signal;

FIG. 2c shows the second derivative of the probe signal; and

FIG. 2d shows the third derivative of the probe signal. In all cases the courses of the signals are shown after equalization or formation of absolute values;

DETAILED DESCRIPTION OF PREFERRED EMBODIMENTS

Figure 1:
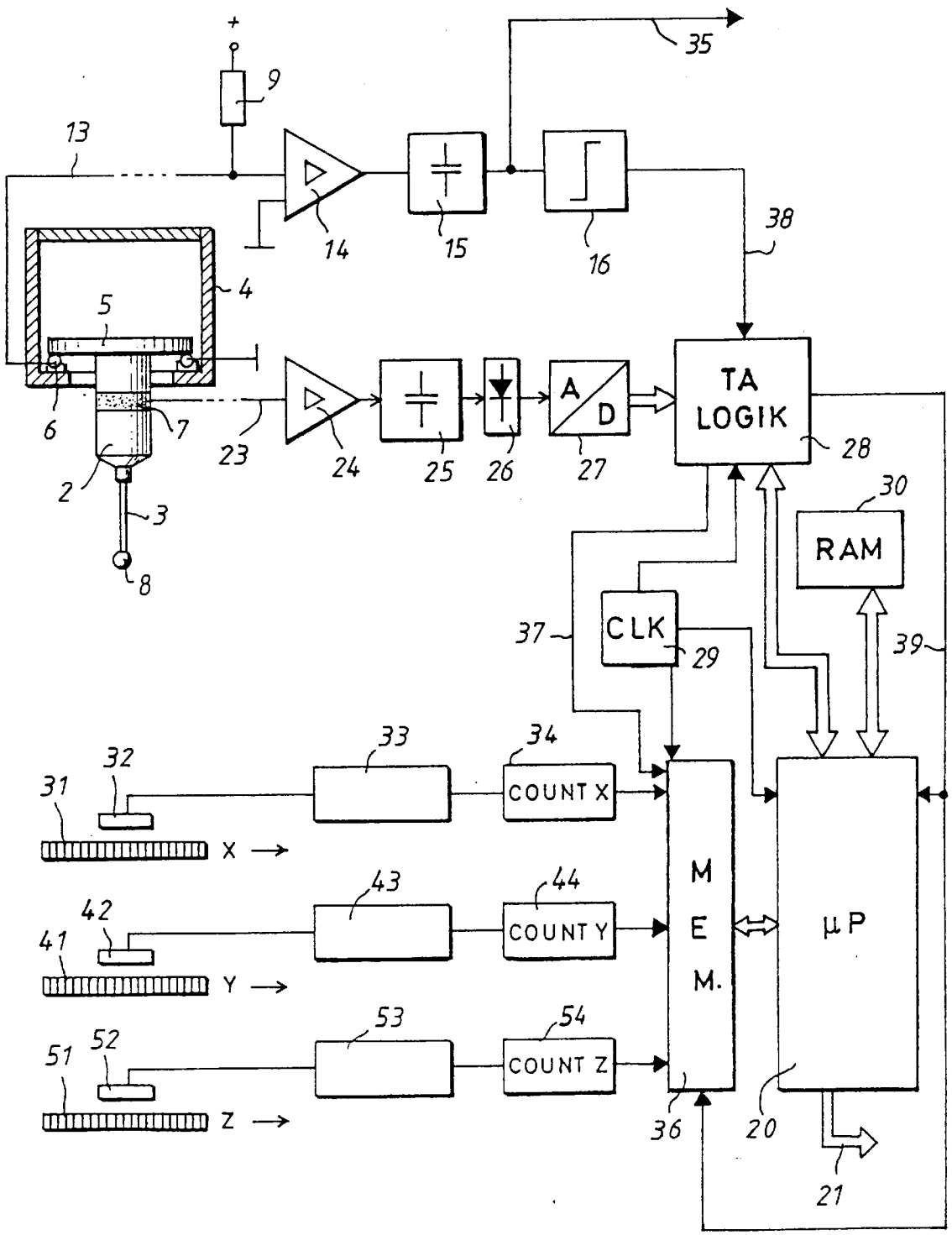
FIG. 1 is a simplified block diagram that shows the required components that are essential for the signal processing of the probe signal corresponding to a process according to the invention.

In FIG. 1, the probe head of a coordinate measurement device of the switching type is shown in a simplified manner. The probe pin (3) with the probe ball (8) is attached to a support (2) that is resiliently mounted on balls (6). As regards to the mounting, three cylindrical bodies on the underside of the part (5) connected to the support (2) form an electrical series circuit. These cylindrical bodies engage with three pairs of balls, respectively offset by 120°, on the portion (4) fixed to the housing. On deflection of the probe pin (3) after contact of the probe ball (8) with the workpiece, at least one of the three switches of the series circuit opens, whereby an electrical switching signal is produced. The signal lead of this first switching signal is denoted by (13). The switching signal lead (13) passes via an amplifier stage (14), a filter stage (15), and a pulse shaping stage (16) via a lead (38) to the probe head logic (28).

In the support (2) for the probe pin (3), the probe head has a piezoelectric sensor (7) which is connected via a second signal lead (23) to the input of a second preamplifier (24). A high pass filter (25) is connected after the preamplifier (24), and blocks the purely direct current component of the signal. A rectifier stage (26) follows the filter. An analog/digital converter (27) follows the rectifier stage (26).

The output of the analog/digital converter (27) is connected to the probe head logic (28). The probe head logic (28) contains a processor for preprocessing the probe signal and a shift register in which the time course of the probe signal over a period of time is stored. For example, 25.6 milliseconds in intervals of, for example, 100 microseconds. That is, the time course of the probe signal in the last 25.6 milliseconds is present in this shift register and is available to be called up by the microprocessor (20).

The probe head is attached to the movable measuring arm of a coordinate measuring device that is not shown here.

Three scales (31, 41 and 51) are associated with the three measuring slides of the coordinate measuring device, in order to sense the length measurement values in the three coordinate directions (x, y and z). The scales (31, 41 and 51) are scanned by reading heads (32, 42 and 52). The signal sequences supplied by the reading heads are fed, after digital interpolation in three interpolators (33, 43 and 53), to counter components (34, 44 and 54). The counter outputs are connected to a second shift register (36), in which the time course of the counter states is likewise stored over a period of 25.6 milliseconds, with a resolution of, for example, 100 microseconds. The second shift register (36), and the shift register in the probe head logic (28), are synchronized with the microprocessor (20) via the clock (29), so that the exact time relationship between the probe signal course and the position of the probe head is ensured.

In a contact process, the signal (23) emitted by the piezo crystal (7), after passage through the high pass filter (25) and after rectification by rectifier stage (26), exceeds at some time a threshold of, for example, 200 units (relative intensity). The threshold has been set in the probe head logic (28). This occurs at a point in time which is later than the contact moment proper (tk), at which the probe ball (8) first contacts the workpiece to be measured, and occurs when the signal intensity reaches the set threshold due to the increasing measurement force between the ball and the workpiece. At this point in time t=0, the shift register in the probe head logic (28) and also the shift register (36) are "frozen" via the signal lead (37). The probe head logic (28) now awaits the switching signal from the bearings (6) of the probe head, which open somewhat later. When the signal reaches the lead (38), the probe head logic (28) sets the contact process "valid" and sends a corresponding signal pulse via the signal lead (39) to a digital input of the microprocessor (20).

Figure 4:
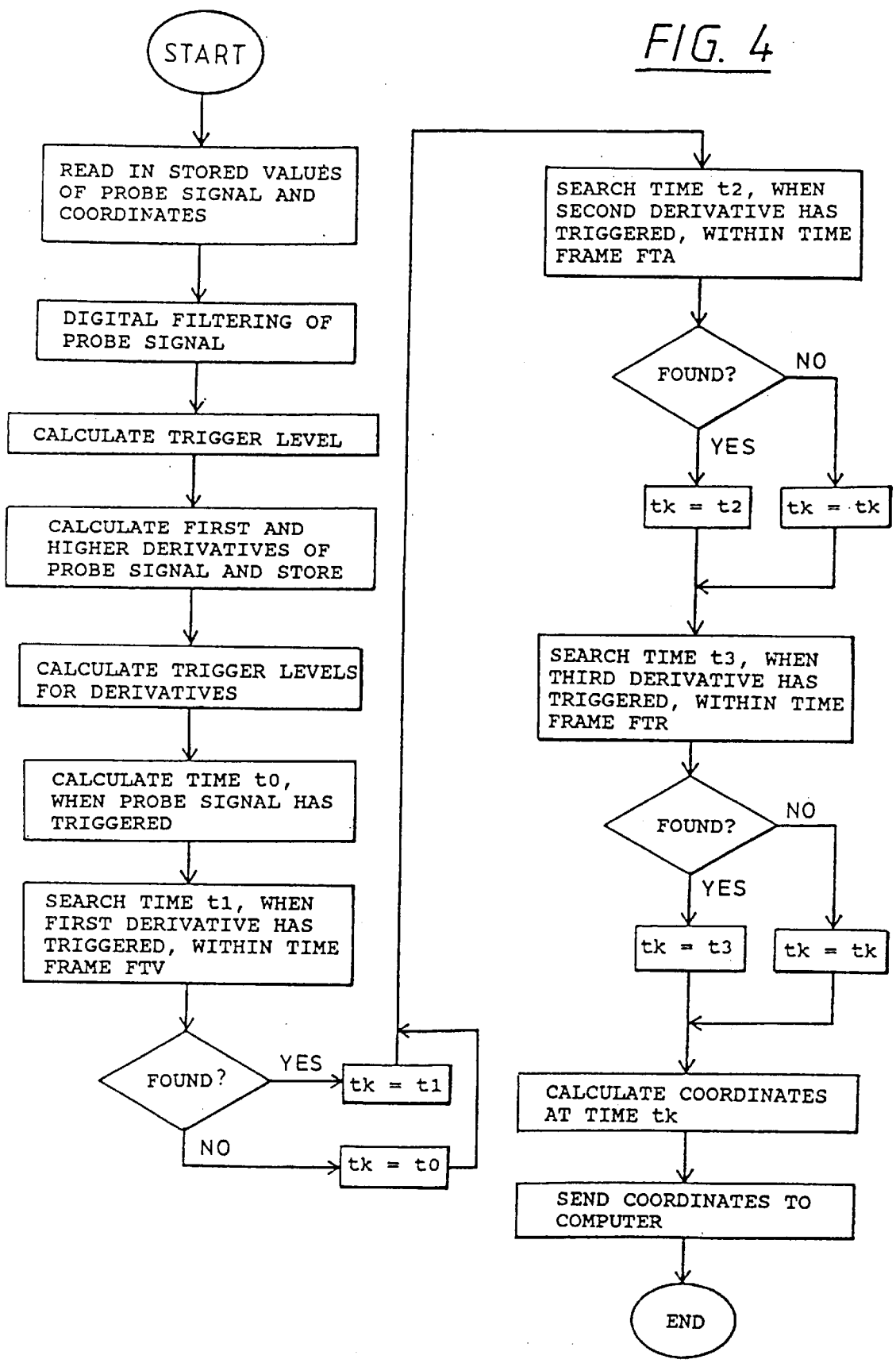
FIG. 4 is a flow diagram showing the probe signal evaluation in detail for determining the exact moment of contact for the first process.

As soon as this occurs, the probe signal intermediately stored in the memory of the probe head logic (28), and the time courses of the length measurement values (x, y and z) present in the memory (36) are taken by the microprocessor (20) from the shift registers and are placed in a volatile memory (30). The further processing of the called-up measurement values then takes place according to a sequence which is programmed in the firmware of the microprocessor (20). This sequence is illustrated in the flow diagram of FIG. 4 and is described in more detail below.

The probe signal is first slightly smoothed by a phase-corrected filter algorithm, in order to suppress interference peaks. Digital filter algorithms for this purpose are known per se, so that no further details of them are necessary.

The course of the probe signal in the first 15.6 milliseconds, in which the coordinate measuring device was still in the so-called contact seeking path before the respective contact, is then evaluated for the generation of a dynamic trigger threshold. During this time, the signal is solely "noise", and the dynamic trigger threshold is set to twice the value of the maximum noise amplitude found in this period. The minimum value of the dynamic trigger threshold is of course adjustable, or can be predetermined by the microprocessor (20).

Figure 2A:
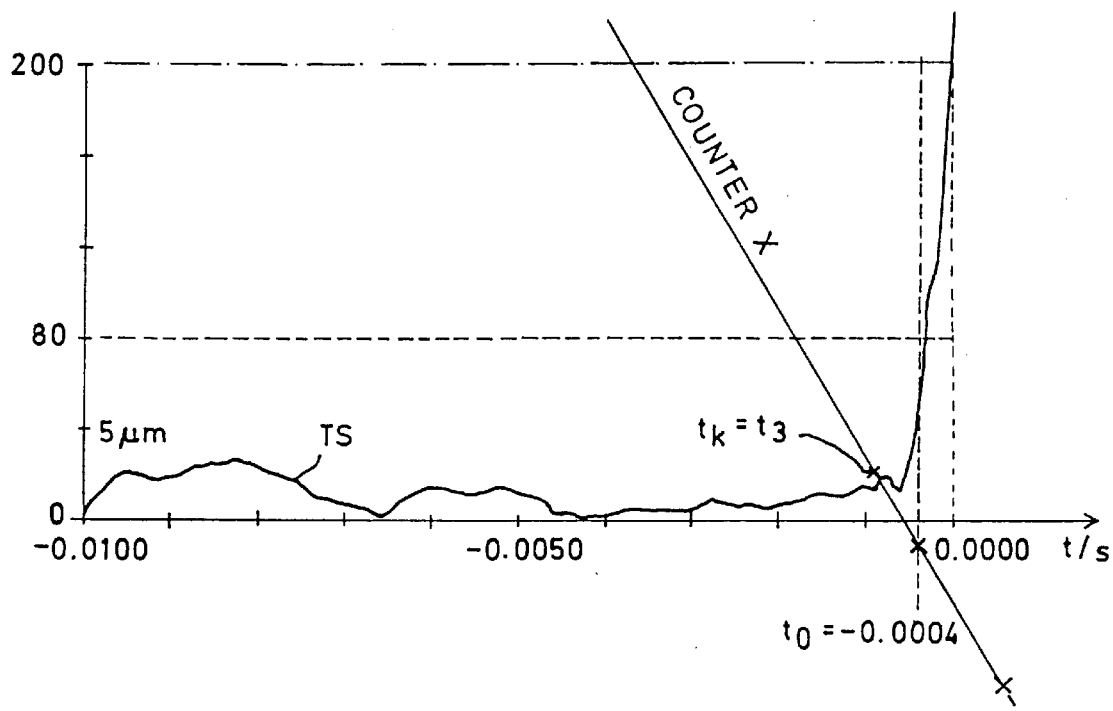
FIGS. 2a–2d are diagrams showing the time course of the probe signal before, during and after contact with a workpiece.

The further signal course of 10 milliseconds, which follows the first 15.6 milliseconds and which then includes the contact process proper, is shown in the diagram of FIG. 2a. The smoothed probe signal is denoted by TS. The horizontal dot-dash line at 200 intensity units describes the set threshold for the freezing of the shift register at the moment (t=0) which defines the beginning or the end of the stored measurement sequence for the probe signal. The horizontal dashed line beneath it indicates the previously described dynamic trigger threshold, which in this case is set to a value of 80 intensity units and which serves for the precise determination of the moment of contact proper (tk).

Figure 2B:
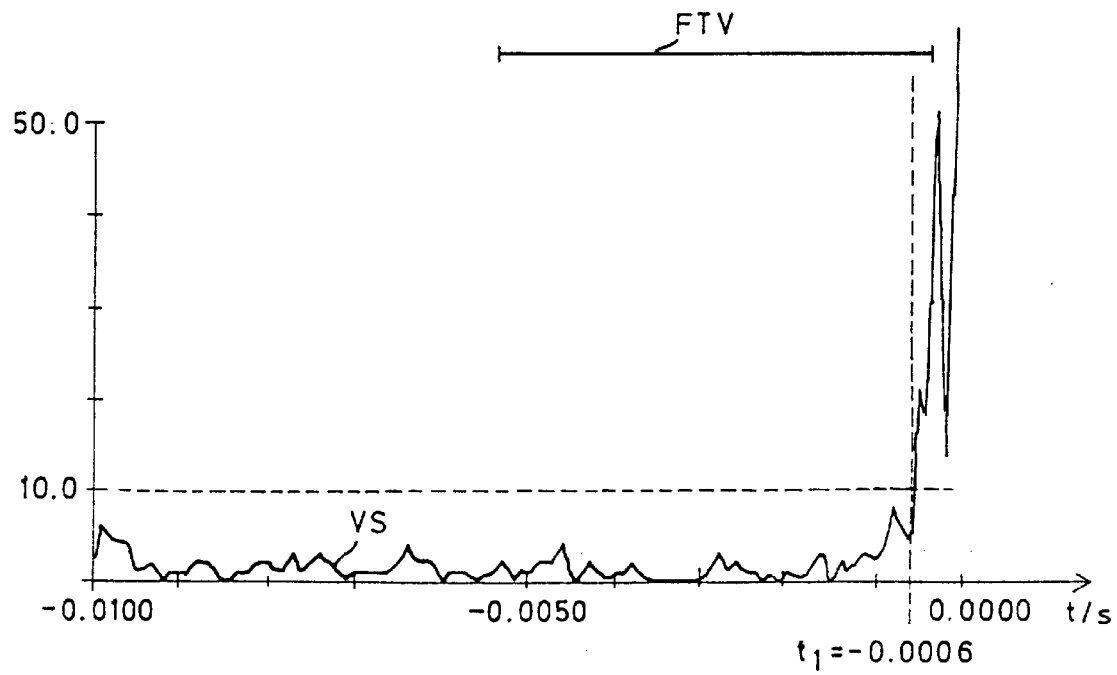

Apart from this, the microprocessor (20), by forming differences of successive values of the probe signal (TS), forms the first derivative of the probe signal, namely the velocity signal (VS). This signal is shown in FIG. 2b for the same period of 10 milliseconds, counting back from the occurrence of the switching signal.

A trigger threshold is also calculated for the first time derivative (VS), from the values lying further back in time. This is again the horizontal dashed line, which intersects the coordinate at the value of 10 intensity units. It amounts to twice the maximum noise amplitude of the signal (VS).

The second time derivative of the probe signal is likewise formed by the microprocessor (20) from the signal (VS), by forming the differences of successive measurement points. The absolute values (computational rectification) are shown as the acceleration signal (AS) in FIG. 2c.

Figure 2C:
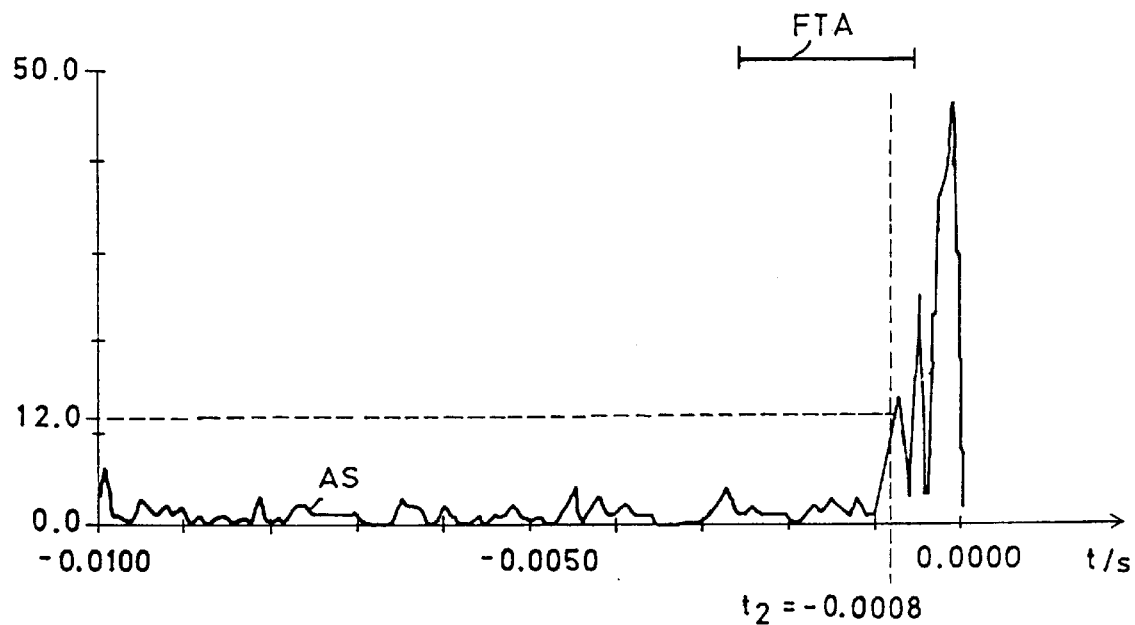

A trigger threshold is also generated for the signal (AS) which was calculated to have a value of 12 intensity units, as shown in FIG. 2c.

Figure 2D:
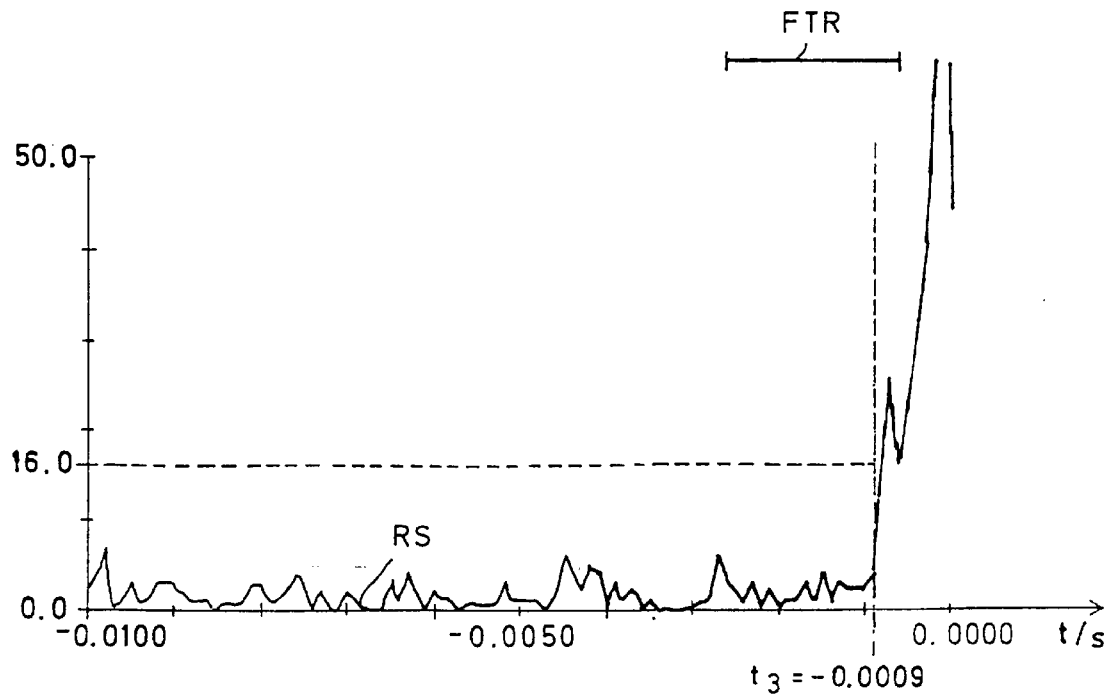

Finally, the microprocessor (20) calculates from the rectified acceleration signal (AS) the so-called jolt signal (RS) as a rectified third time derivative of the probe signal (TS). The course of this signal is shown in FIG. 2d. The trigger threshold, obtained from the course, not shown, which occurred earlier in time, is 16 intensity units.

The four signal courses shown in FIGS. 2a–2d—the probe signal and its three derivatives—are stored in RAM (30) by the microprocessor (20), and are then further evaluated to determine the moment of contact. The moment at which the smoothed probe signal (TS) reached the trigger threshold is first sought. In the example shown, this is the case for the measurement point which follows the moment −400 ms. Thus the microprocessor (20) assigns for the time being this moment t0=−400 ms as the moment of contact.

The microprocessor (20) then examines the velocity signal (VS) for the moment when the velocity signal (VS), within a time window (FTV) of 5 milliseconds before the moment (t0), first reached the trigger threshold which was set at 10 intensity units. This is the case at the moment t1=−600 ms. The moment of contact (tk) is correspondingly corrected, and is set to this moment t1=−600 ms. If the trigger threshold was not reached within the time window (FTV), the value (t0) derived from the probe signal would still remain valid and would be further processed as the moment of contact.

In the next step, the microprocessor (20) examines the acceleration signal (AS) for the moment when this signal, in a time window (FTA) of 2 milliseconds, reached the trigger threshold for this signal, set at 12 intensity units. This is the case at the moment t2=−800 ms. The moment of contact (tk) is correspondingly newly assigned as the moment (t2). It still holds here that the old value (t1) would be maintained for (tk) in the case that the trigger threshold was not reached in the time window (FTA).

Finally, in the same manner, the jolt signal (RS) (FIG. 2d) is examined as to whether the set trigger threshold of 16 intensity units was reached within a third time window (FTR) of likewise 2 milliseconds, calculated from the trigger moment (t1) of the velocity signal in the "past" direction; the moment concerned (t3), −900 ms in this example, is now finally assigned as the moment of contact (tk). The microprocessor (20) now calculates the contact coordinates from the counter states of the length measurement systems (31/32, 41/42, 51/52) that were stored over time, by means of the moment of contact which has thus been found, and passes on these contact coordinates via the data lead (21) to the evaluation computer of the coordinate measuring device.

The result is likewise illustrated in FIG. 2a. The course with time of the counter state for the x-coordinate (counter x) for the example shown has been added as a descending straight line. Between the counter state at the moment (t0), at which the contact signal proper triggered, and the counter state at the moment tk=t3, at which the third derivative, the jolt signal, triggered, there are 500 ms, which corresponds to a path of 5 mm at a contact speed of 10 mm/s. With soft workpieces, the intensity of the contact signal rises still more slowly, so that in such cases the moments t0–t3 lie appreciably further apart and the attainable increase in accuracy in contrast to the heretofore known evaluation processes is several times greater. Such slowly rising courses of signals then possibly require longer time windows (FTV, FTA and FTR). It is therefore advisable to make these time windows adjustable by the computer of the coordinate measuring device.

With the measures described it has become possible for the first time to measure soft parts with sufficient accuracy.

In the described preferred embodiment, the time derivatives of the contact signal have been obtained computationally by means of a suitable firmware program, by formation of the differences of the individual measurement values. It is also possible to generate and to evaluate the differentiated signals with suitable electronic components, that is, by means of hardware.

In the manner described, the moment of contact is thus "moved backward" in time by means of the higher time derivatives, and thus the "true" moment of contact is approximated. Trials have shown that the moment of contact (tk), thus determined, agrees very closely with the moment of the very first contact of the probe ball with the workpiece.

Figure 3A:
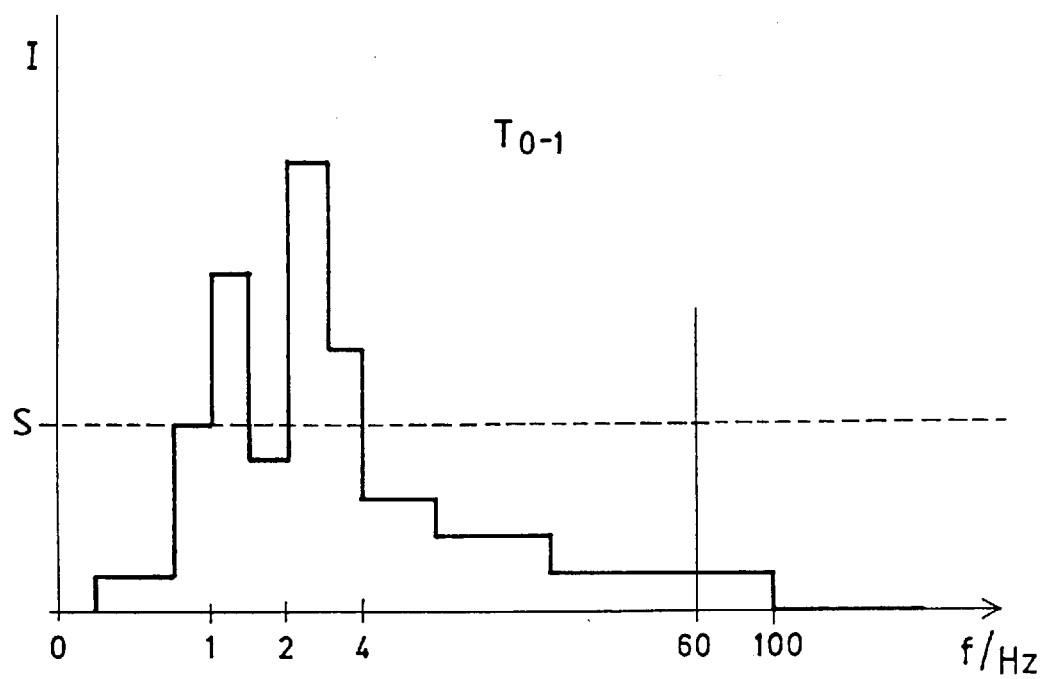
FIGS. 3a–3b show respective Fourier-transformed frequency spectra which were obtained from the probe signal at different moments in time.
Figure 3B:
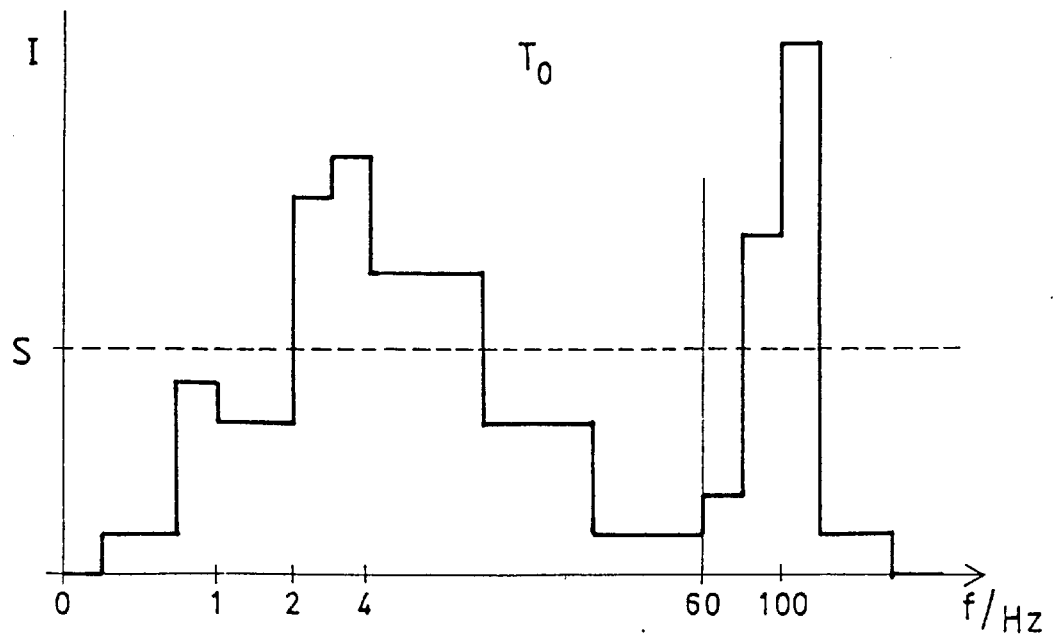

An alternative process for the improved determination of the moment of contact is sketched in FIGS. 3a and 3b. In this process, the time derivative or the higher time derivatives are not formed from the stored contact signal. Instead, this signal is partitioned into individual intervals, which can even overlap, and which lie increasingly close together in the neighborhood of the moment of contact.

The frequency spectrum of the contact signal is then calculated, by Fourier transformation, from the course of the signal within these intervals. Such a frequency spectrum is shown in the examples in FIGS. 3a and 3b.

As soon as the Fourier calculation runs over an interval which for the first time contains the moment of contact, additional frequency components with higher amplitudes occur in given, higher frequency regions. The higher frequency regions depend on machine parameters such as, for example, the speed of travel and the mechanical dimensions of the measuring slide of the coordinate measuring device. The additional frequency components with higher amplitudes are recognizable by setting suitable thresholds (S) in these higher frequency regions, above 60 Hertz in the example shown.

The new process according to the present invention has been described, up to this point, in connection with a probe head of the switching type. It can, however, also be used in connection with probe heads of the measuring type, when these are used for single point measurements. In this case, the analog signal of the path measurement systems in the probe head for the three directions of deflection is differentiated and triggered multiple times, in the same manner as the piezo signal of a probe head of the switching type.

I claim:

1. A process for coordinate measurement on workpieces, using a coordinate measuring device with a probe head that produces a probe signal on making contact with a workpiece to be measured, said process comprising the steps of:
    contacting said workpiece with said probe head and producing said probe signal on making said contact;
    differentiating said probe signal (TS) with respect to time to evaluate at least one time derivative (VS, AS, RS) of said probe signal to determine an exact moment of contact (tk) of said probe head with said workpiece and,
    setting a trigger threshold for said time derivative and assigning said exact moment of contact (tk) as a moment (t1, t2, t3) at which said time derivative (VS, AS, RS) of said probe signal (TS) reaches said trigger threshold.

2. The process according to claim 1, further comprising adjusting said trigger threshold.

3. The process according to claim 1, further comprising automatically adapting said trigger threshold to a noise amplitude of said probe signal (TS).

4. The process according to claim 1, wherein said at least one time derivative is only one time derivative of said probe signal.

5. The process according to claim 1, wherein said at least one time derivative is several time derivatives (VS, AS, RS) of said probe signal.

6. The process according to claim 5, in which several trigger thresholds are respectively set for said several time derivatives, further comprising assigning as said moment of contact (tk) the earliest moment (t3) at which one of said trigger thresholds set for said time derivatives (VS, AS, RS) is reached.

7. The process according to claim 1, further comprising storing a time course of said probe signal (TS) and length measurement values (x, y, z) supplied by said coordinate measurement device and digitally differentiating said stored probe signal for determining said exact moment of contact (tk).

8. The process according to claim 1, further comprising filtering said probe signal (TS) prior to said differentiating step.

9. The process according to claim 8, wherein said filtering step comprises filtering said probe signal by means of a phase-corrected bandpass filter.

10. The process according to claim 1, further comprising rectifying said probe signal (TS) prior to said differentiating step.

11. The process according to claim 1, further comprising automatically adapting said trigger threshold to a noise amplitude of said time derivative(VS, AS, RS).

12. A coordinate measuring device with a probe head that produces a probe signal (TS) on contact with a workpiece to be measured, comprising:
    a first memory unit capable of storing a time course of said probe signal (TS) that is fed to said first memory unit,
    a second memory unit capable of storing length measurement values (x,y,z) for a position of said probe head at least for a time interval that includes an exact moment of contact (tk) of said probe head with said workpiece, and
    an evaluation unit to which said first memory unit and said second memory unit are connected, which is capable of determining said exact moment of contact (tk) by differentiating said probe signal (TS) and establishing whether an amplitude of said differentiated probe signal (VS, AS, RS) has reached an adjustable threshold and assigning said exact moment of contact as a moment at which said amplitude reaches said adjustable threshold.

* * * * *